(12) United States Patent
Huang

(10) Patent No.: US 9,618,917 B2
(45) Date of Patent: Apr. 11, 2017

(54) POWER CONTROL DEVICE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Yong-Zhao Huang, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 287 days.

(21) Appl. No.: 14/577,046

(22) Filed: Dec. 19, 2014

(65) Prior Publication Data

US 2016/0126040 A1    May 5, 2016

(30) Foreign Application Priority Data

Oct. 31, 2014    (CN) .......................... 2014 1 0598400

(51) Int. Cl.
| | |
|---|---|
| *H01H 47/00* | (2006.01) |
| *G05B 15/02* | (2006.01) |
| *H02H 3/00* | (2006.01) |
| *G05F 3/02* | (2006.01) |
| *G06F 1/00* | (2006.01) |
| *H02J 1/00* | (2006.01) |

(52) U.S. Cl.
CPC .............. *G05B 15/02* (2013.01); *G05F 3/02* (2013.01); *G06F 1/00* (2013.01); *H01H 47/00* (2013.01); *H02H 3/00* (2013.01); *H02J 1/00* (2013.01)

(58) Field of Classification Search
CPC ........ H01H 47/00; H01H 47/24; G05B 15/02; H02J 1/00; H02H 3/24; G06F 1/00; G05F 3/02
USPC .............. 361/42; 327/544; 307/117, 126, 116
See application file for complete search history.

(56) References Cited

U.S. PATENT DOCUMENTS

| | | | |
|---|---|---|---|
| 2008/0043387 A1* | 2/2008 | Weil ...................... | H02H 11/002 361/42 |
| 2009/0295469 A1* | 12/2009 | DuBose ................ | H02M 3/156 327/544 |
| 2010/0019583 A1* | 1/2010 | DuBose .................... | G06F 1/26 307/126 |

* cited by examiner

*Primary Examiner* — Jared Fureman
*Assistant Examiner* — Win Htun
(74) *Attorney, Agent, or Firm* — Zhigang Ma

(57) ABSTRACT

A power control device includes a multiple socket-outlet, a power plug and a power supply control circuit. The control circuit includes a power output unit, a first relay and a second relay, a first capacitor, a mechanical switch, an electronic switch and a connector connected to the host of a computer to receive a first voltage. The mechanical switch is turned on to supply power to the multiple socket-outlet, the first relay is closed, the power output unit outputs a working voltage for charging the first capacitor, the electronic switch is turned on, the second relay is closed. If the connector is turned off, the electronic switch is turned off, and the second relay is turned off so that the the multiple socket-outlet is closed.

8 Claims, 1 Drawing Sheet

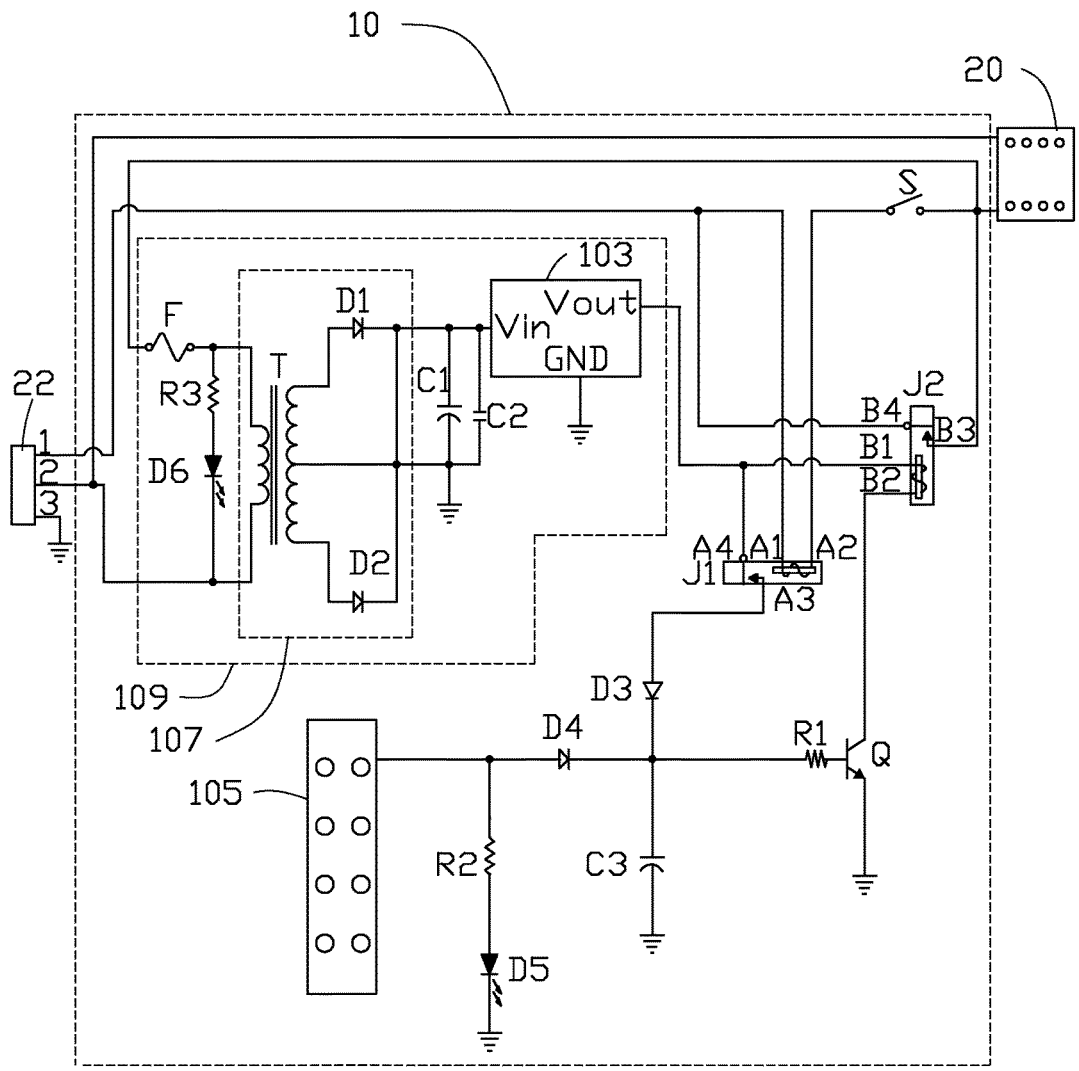

POWER CONTROL DEVICE

FIELD

The subject matter herein generally relates to a power control device.

BACKGROUND

Computers have become part of our daily life. A large number of computer accessories and peripherals have emerged, such as displays, audio devices, printers, and scanners. Each of the computer accessories and peripherals may have its own independent power supply. When a computer is shut off, a user may still need to shut down each computer assessor or peripheral one by one.

BRIEF DESCRIPTION OF THE DRAWINGS

Implementations of the present technology will now be described, by way of example only, with reference to the attached figures.

The FIGURE is a circuit diagram of the power control device.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiment described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

The present disclosure is in relation to a power control device.

The FIGURE illustrates an embodiment of a power control device. The power control device includes a control circuit 10, a multiple socket-outlet 20 connected to the control circuit 10, and a power plug 22 connected to the multiple socket-outlet 20. In this embodiment, power supply terminals of a computer, a monitor, a scanner, a printer and other electronic devices are connected to the multiple socket-outlet 20.

The control circuit 10 includes a fuse F, a transformer T, three capacitors C1-C3, a power conversion chip 103, six diodes D1-D6, three resistors R1-R3, an electronic switch, a relay J1, a relay J2, a mechanical switch and a connector connected to the computer host. In this embodiment, the mechanical switch is a normal-open S, the electronic switch is a transistor Q, the connector is a USB interface 105 connected to an USB interface of a host computer. In other embodiments, the electronic switch can be a MOSFET (Metal-Oxide-Semiconductor Field-Effect Transistor).

The power plug 22 is connected to a power supply socket outlet. The power plug 22 includes a live terminal 1, the neutral power terminal 2 and a ground terminal 3. A first end of the multiple socket-outlet 20 is connected to the first end 1 of the power plug 22 through the normal-open S, pin A1 and pin A2 of the relay J1. A second end of the multiple socket-outlet 20 is connected to the neutral power terminal 2 of the power plug 22. One end of a primary coil of the transformer T is connected to the neutral power terminal 2 of the power plug 22, and the other end of the primary coil is connected to the first end of the multiple socket-outlet 20 through the fuse F. Two ends of the secondary coil of the transformer T are respectively connected to an anode of the diode D1 and an anode of the diode D2. A cathode of diode D1 and a cathode of the diode D2 are connected to a voltage input terminal Vin of the power conversion chip 103. The cathode of the diode D1 is grounded through the capacitor C1 and capacitor C2 connected in parallel. The capacitor C1 is a high frequency filtering capacitor. The capacitor C2 is a low frequency filtering capacitor. A secondary coil of the transformer T leads to a tap intermediately to divide the secondary coil into two symmetric coils. The transformer T, the diode D1, and the diode D2 form a full wave rectifying circuit 107. An anode of a light emitting diode D6 is connected to one end of the primary coil of the transformer T through a resistor R3 and a cathode of the LED D6 is connected to the other end of the primary coil of the transformer T. A voltage output end Vout of the power conversion chip 103 is connected to a pin A4 of the relay J1 and a pin B1 of the relay J2. A pin A3 of the relay J1 is connected to an anode of the diode D3, and a cathode of the diode D3 is grounded through the capacitor C3. The fuse F, the LED D6, the resistor R3, the full wave rectifying circuit 107, the capacitor C1, the capacitor C2 and the power conversion chip 103 form a power output unit 109 to convert an input voltage from the power plug to a direct current of 5V.

The USB interface 105 is connected to an anode of the diode D4. A cathode of the diode D4 is connected to one end of the resistor R1. The other end of the resistor R1 is connected to a base of the transistor Q, a collector of the transistor Q is connected to the pin B2 of the relay J2, and an emitter of the transistor Q is grounded. One end of the resistor R2 is connected to the anode of the diode D4, the other end of the resistor R2 is grounded through the LED D5. A pin B3 of the relay J2 is connected to the first end of the multiple socket-outlet 20. A pin B4 of the relay J2 is connected to the first end of the power plug 22.

In use, the power plug 22 receives an alternating current power. The host, the monitor, the scanner, the printer and other electronic devices are connected to the multiple socket-outlet 20. A "restore on AC Power Loss" option of the basic input output system of the host is set to an AC power on state, that is, the computer host is automatically powered on when the AC power is provided, and there is no need to press a power button of the computer host.

The normal-open S is pressed, the multiple socket-outlet 20 receives AC power through the power plug 22 and supplies the AC power to the host, the monitor, the scanner, the printer and other electronic devices. The AC power is converted to a direct current power through the full wave rectifying circuit 107, and then converted to a direct current output of 5V through the power conversion chip 103 after being filtered through the capacitor C1 and capacitor C2. After the normal-open S is closed, the pin A1 and pin A2 of the relay J1 receive the direct current power and the pin A3 and pin A4 of the relay J1 are connected. The direct current power of 5V from the power conversion chip 103 charges the capacitor C3 through the diode D3. The transistor Q is turned on. The pin B1 and pin B2 of the relay J2 receive the direct current power and the pin B3 and pin B4 of the relay J2 are connected. At the same time, the computer host is boot automatically, and the USB interface 105 outputs a voltage of 5V, to turn on the LED D5. The LED D5 can be used to indicate whether the power supply of the USB interface 105 is work. The LED D6 can be used to indicate whether the control circuit 10 receives the alternating current power.

When the normal-open S is disconnected, the pin A1 and pin A2 of the relay J1 cannot receive the direct current power, the capacitor C3 discharges to turn on the transistor Q, and the pin B3 and pin B4 of relay J2 are connected. The capacitor C3 is charged by the voltage 5V provided from the USB interface 105 through the diode D4, so that the relay J2 is continuously turned on to make the multiple socket-outlet 20 provided power to the electronic devices.

When the computer host is shut down via the operating system, the USB interface 105 stops outputting voltage 5V. When the capacitor C3 finishes discharging, the transistor Q is turned off, and the pin B3 and pin B4 of the relay J2 are disconnected, and the multiple socket-outlet 20 is turned off. So that the monitor, the scanner, the printer, and other electronic devices are turned off at the same time.

It is to be understood, however, that even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A power control device comprising:
   a multiple socket-outlet;
   a power plug; and
   a control circuit connected between the multiple socket-outlet and the power plug, the control circuit comprising a power output unit, a first relay, a second relay, a first capacitor, a mechanic switch, an electronic switch, and a connector connected to a computer host to receive a first voltage;
   wherein a first end of the multiple socket-outlet is connected to a first end of the power plug through the mechanic switch and the first relay, the second end of the multiple socket-outlet is connected to a second end of the power plug, an input terminal of the power output unit is connected to the first end and the second end of the power plug, the output terminal of the power output unit is connected to the first relay and the second relay, the first relay is grounded through the first capacitor, the connector is connected to a control terminal of the electronic switch, a first end of the electronic switch is connected to the second relay, a second end of the electronic switch is grounded, the second rely is connected to the first end of the multiple socket-outlet, and the second relay is connected to the power plug;
   wherein when the mechanical switch is turned on to supply power to the multiple socket-outlet, the first relay is closed, the power output unit outputs a working voltage for charging the first capacitor, the electronic switch is turned on, the second relay is closed;
   wherein when the mechanical switch is turned off, the first capacitor is charged by the first voltage, and the electronic switch is turned on, and the second relay is closed; and
   wherein when the first voltage is turned off, the electronic switch is turned off, and the second relay is turned off so that the the multiple socket-outlet stops providing power supply.

2. The power control device of claim 1, wherein the power output unit comprises a fuse, a first resistor, a first diode, a full wave rectifying circuit, a second capacitor, a third capacitor and a power conversion chip; the full wave rectifying circuit comprises a transformer, a second diode and a third diode, one end of a primary coil of the transformer is connected to the second end of the power plug, and the other end of the primary coil of the transformer is connected to the first end of the multiple socket-outlet through the fuse, an anode of the first diode is connected to one end of the primary coil of the transformer, a cathode of the first diode is connected to the other end of the primary coil of the transformer, two ends of an secondary coil of the transformer are respectively connected to an anode of an second diode and an anode of the third diode, a cathode of the second diode and a cathode of the third diode are connected to the voltage input terminal of the power conversion chip.

3. The power control device of claim 2, wherein an anode of the second diode is connected to an output terminal of the full wave rectifying circuit, a cathode of the second diode is grounded, an anode of the third diode is connected to the output terminal of the full wave rectifying circuit, a cathode of the third diode is grounded.

4. The power control device of claim 3, wherein the second capacitor is a high frequency filtering capacitor, and the third capacitor is a low frequency filtering capacitor.

5. The power control device of claim 4, wherein the control circuit further comprises a fourth diode, a fifth diode, a sixth diode, a second resistor, and a third resistor, an anode of the fourth diode is connected to the first relay, a cathode of the fourth diode is grounded through the first capacitor, an anode of the fifth diode is connected to the connector, a cathode of the fifth diode is connected to one end of the second resistor, the other end of the second resistor is connected to a control end of the electronic switch, one end of the third resistor is connected to a node between the connector and the fifth diode, the other end of the third resistor is connected to an anode of the sixth diode, and a cathode of the sixth diode is grounded.

6. The power control device of claim 5, wherein the first diode and the sixth diode are light emitting diode.

7. The power control device of claim 6, wherein the electronic switch is a transistor, the control end of the electronic switch is a base of the transistor, the first end of the electronic switch is a collector of the transistor, and the second end of the electronic switch is an emitter of the transistor.

8. The power control device of claim 1, wherein the electronic switch is a metal-oxide-semiconductor field-effect transistor.

* * * * *